United States Patent
Swan et al.

[11] Patent Number: 6,091,330
[45] Date of Patent: Jul. 18, 2000

[54] INTEGRATED VEHICLE REMOTE ENGINE IGNITION SYSTEM

[75] Inventors: James L. Swan, Livonia; David J. Berels, Belleville; Jerome Ng, Ann Arbor, all of Mich.

[73] Assignee: Lear Automotive Dearborn, Inc., Southfield, Mich.

[21] Appl. No.: 09/097,084

[22] Filed: Jun. 12, 1998

[51] Int. Cl.[7] ............................................ G08B 1/08
[52] U.S. Cl. ..................... 340/539; 307/10.6; 340/426; 340/825.69; 340/825.72; 341/176
[58] Field of Search ................................... 340/539, 426, 340/825.69, 825.72; 341/176; 307/10.6

[56] References Cited

U.S. PATENT DOCUMENTS

| | | | |
|---|---|---|---|
| 4,928,778 | 5/1990 | Tin | 180/167 |
| 5,129,376 | 7/1992 | Parmley | 180/167 |
| 5,136,548 | 8/1992 | Claar et al. | 367/903 |
| 5,614,885 | 3/1997 | Van Lente et al. | 340/825.69 |
| 5,673,017 | 9/1997 | Dery et al. | 340/825.69 |
| 5,686,903 | 11/1997 | Duckworth et al. | |
| 5,838,255 | 11/1998 | Di Croce | 340/825.72 |
| 5,903,063 | 5/1999 | Blaker | 307/10.6 |

FOREIGN PATENT DOCUMENTS 195 28 099 A1  2/1997  Germany.

*Primary Examiner*—Brent Swarthout
*Attorney, Agent, or Firm*—Brooks & Kushman, P.C.

[57] ABSTRACT

A remotely controlled electrical accessory system for starting an engine of a vehicle and actuating a garage door opener attached to a garage door. The system includes a first transmitter for producing an engine ignition signal and a second transmitter for producing a garage door opener actuation signal. A receiver starts the engine of the vehicle and energizes the second transmitter to produce the garage door opener actuation signal in response to the engine ignition signal. In a preferred embodiment, the system includes a proximity sensor attached to the vehicle for producing a gating signal in response to a closed garage door. Preferably, the receiver starts the engine of the vehicle in response to the engine ignition signal and energizes the second transmitter to produce the garage door opener actuation signal in response to the engine ignition signal and the gating signal.

16 Claims, 3 Drawing Sheets

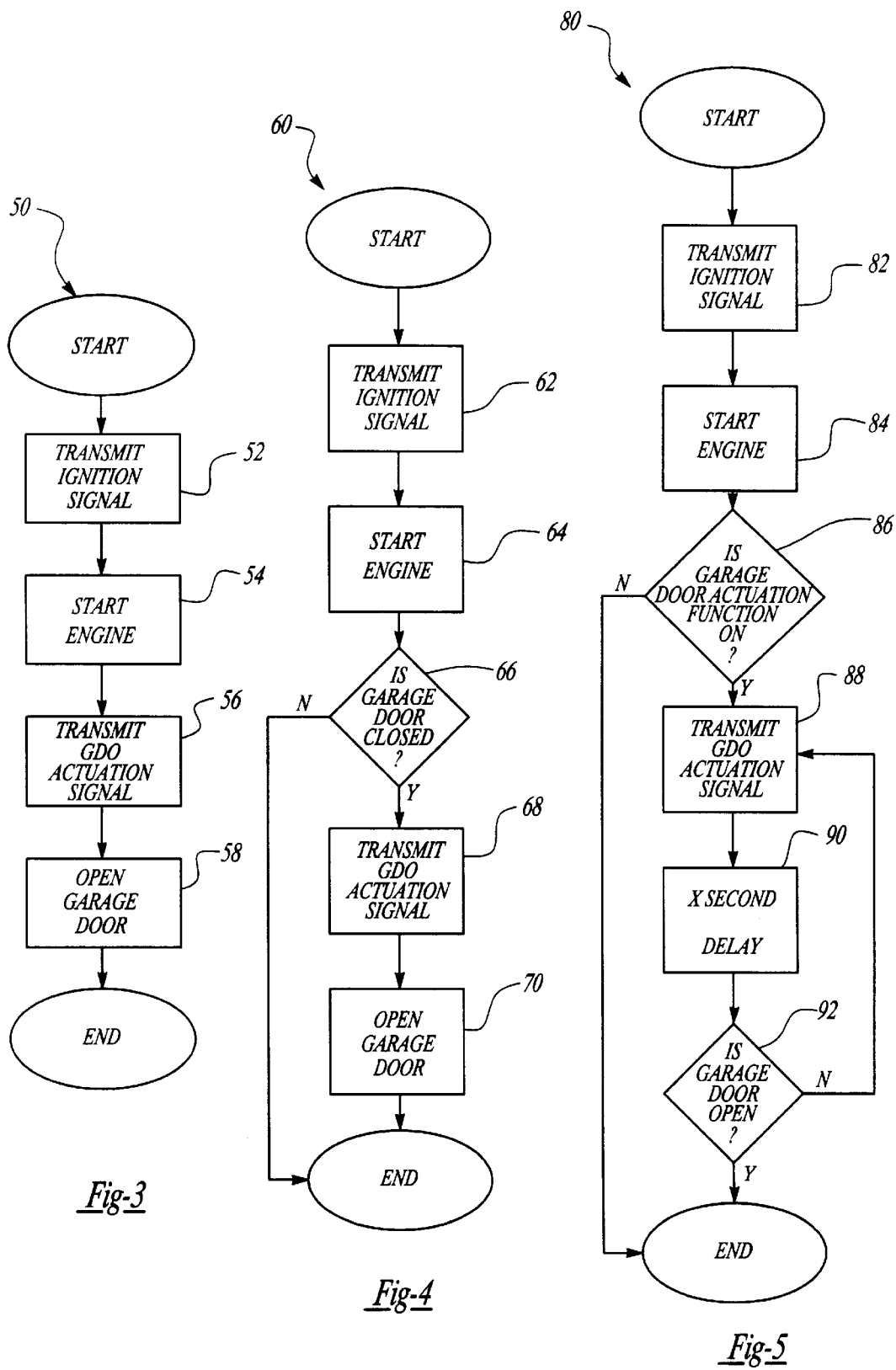

6,091,330

INTEGRATED VEHICLE REMOTE ENGINE IGNITION SYSTEM

BACKGROUND OF THE INVENTION

This invention relates to a remotely controlled engine ignition system.

Modern vehicles include a variety of electrical accessory systems such as remotely controlled engine ignition systems, universal transmitters, and object detection systems. Typically, object detection systems produce a visual and/or audible warning when an object enters an obstructed portion of a driver's rear view, referred to as a rear "blind spot". When a vehicle is driven in the forward gear, the warning usually indicates that another vehicle is following in a rear "blind spot". When the vehicle is driven in the reverse gear, the warning usually indicates that a child or object, such as a ball or other toy, has crossed the rearward path of the vehicle. To detect the presence of an object in a rear "blind spot", object detection systems typically include a plurality of proximity sensors located in the rear of the vehicle.

Many modern vehicles further include a universal transmitter capable of "learning" and reproducing one or more radio frequency signals. Thus, a single universal transmitter can replace several separate transmitters used to operate radio frequency signal controlled devices such as garage door openers, security gate openers, home security systems, and home lighting systems. Typically, the universal transmitter is mounted to the driver's sun visor or the headliner of the vehicle. In this manner, the universal transmitter provides a convenient way to consolidate the functions of several hand-held transmitters into one vehicle mounted device.

Many modern vehicles also include a remotely controlled engine ignition system. A remotely controlled engine ignition system enables the driver to start the engine of the vehicle from a distant location. Although these systems increase driver convenience, remotely controlled engine ignition systems present safety concerns. The foremost safety concern is carbon monoxide poisoning which can occur when the vehicle is remotely started in a closed garage.

SUMMARY OF THE INVENTION

In a disclosed embodiment of this invention, a remotely controlled electrical accessory system is provided for starting an engine of a vehicle and actuating a garage door opener attached to a garage door. The remotely controlled electrical accessory system includes a first transmitter for producing an engine ignition signal and a second transmitter for producing a garage door opener actuation signal. A receiver starts the engine of the vehicle and energizes the second transmitter to produce the garage door opener actuation signal upon receipt of the engine ignition signal.

In a preferred embodiment of this invention, the remotely controlled electrical accessory system includes a proximity sensor attached to the vehicle for producing a gating signal in response to a closed garage door. Preferably, the receiver starts the engine of the vehicle in response to the engine ignition signal and energizes the second transmitter to produce the garage door opener actuation signal in response to both the engine ignition signal and the gating signal.

These and other features of the present invention will be best understood from the following specification and drawings, the following of which is a brief description.

BRIEF DESCRIPTION OF THE DRAWINGS

FIG. 3 is a flow chart of a first method for remotely starting an engine of a vehicle and actuating a garage door opener in accordance with the present invention.

FIG. 4 is a flow chart of a second method for remotely starting the engine of the vehicle and actuating the garage door opener in accordance with the present invention.

FIG. 5 is a flow chart of a third method for remotely starting the engine of the vehicle and actuating the garage door opener with accordance with the present invention.

DETAILED DESCRIPTION OF THE PREFERRED EMBODIMENT

Figure 1:
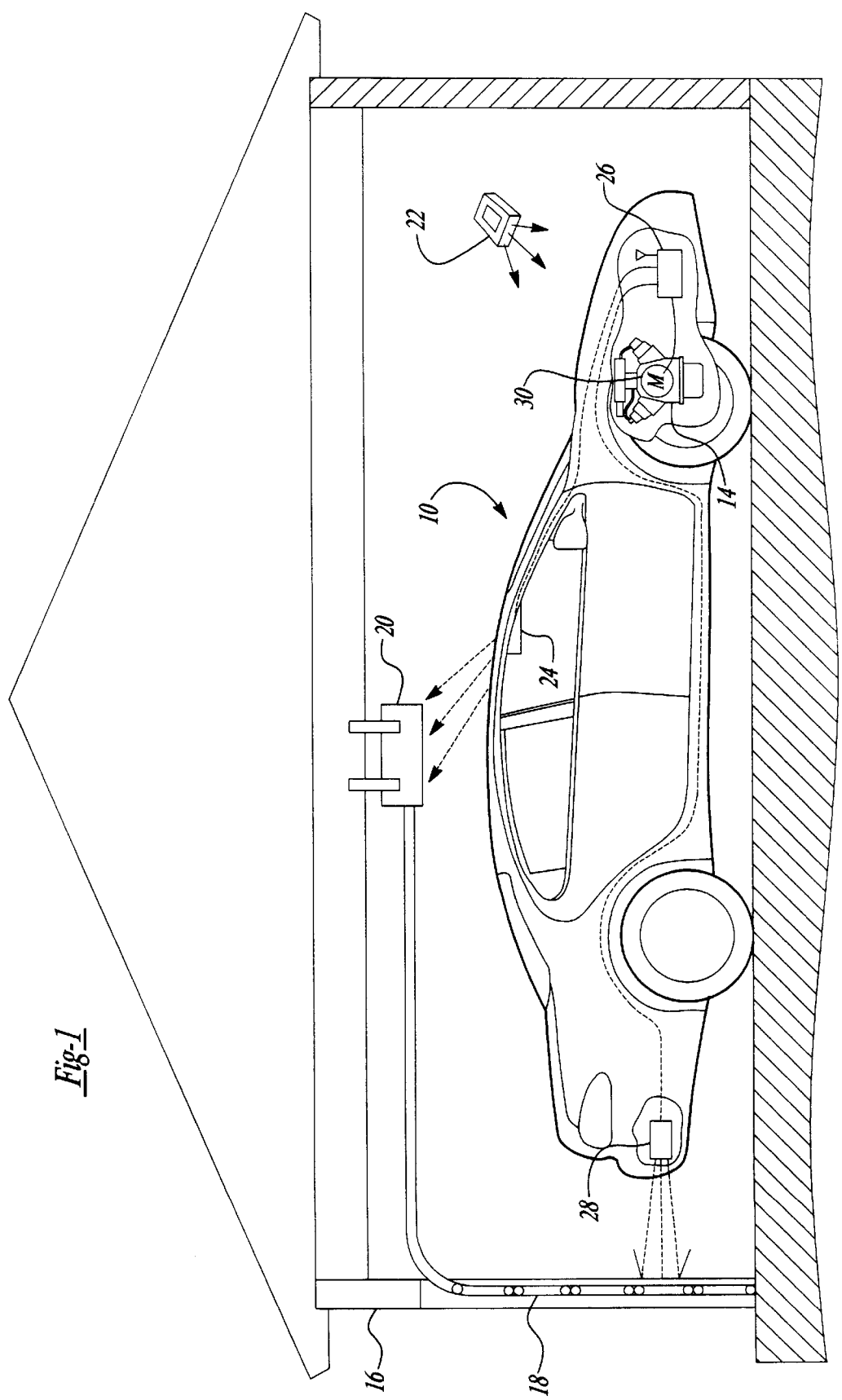
FIG. 1 is a fragmentary side view of a vehicle including a remotely controlled electrical accessory system in accordance with the present invention.

FIG. 1 is a fragmentary side view of a vehicle 10 including a remotely controlled electrical accessory system 12 in accordance with the present invention. The vehicle 10, having an engine 14, is shown parked in a closed garage 16. The garage 16 has a garage door 18 which is opened and closed by a garage door opener 20. The garage door opener 20 is of a conventional design and, thus, controlled by a unique signal transmitted from a wireless transmitter. The remotely controlled electrical accessory system 12 includes a first transmitter 22, a second transmitter 24, a receiver 26, a proximity sensor 28, and an engine starter motor 30. Preferably, the first transmitter 22 is of a conventional design including a portable housing and circuitry. This type of hand-held transmitter is sometimes referred to as a key fob. Typically, the second transmitter 24 is mounted to the driver's sun visor or to the headliner of the vehicle within the reach of the driver. In one embodiment of the present invention, the proximity sensor 28 is mounted in the rear of the vehicle. In accordance with the present invention, one of ordinary skill in the art will recognize that any type of sensor capable of detecting an object within a predetermined distance from the sensor may be employed as the proximity sensor 28.

Figure 2:
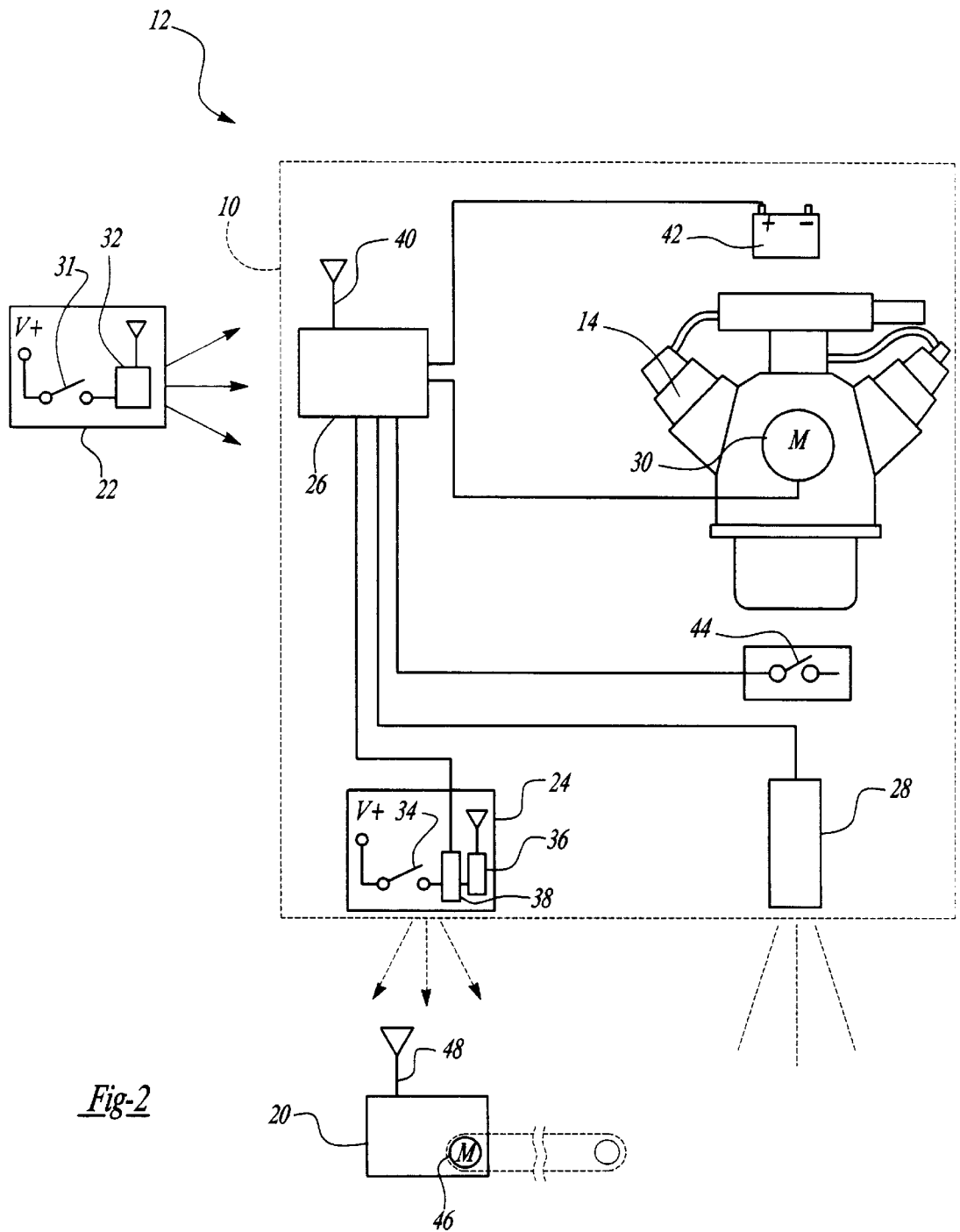
FIG. 2 is an electrical schematic diagram of the remotely controlled electrical accessory system in accordance with the present invention.

FIG. 2 is an electrical schematic diagram of the remotely controlled electrical accessory system 12 in accordance with the present invention. The first radio frequency transmitter 22 produces a first radio frequency signal hereinafter referred to as the engine ignition signal. The first transmitter 22 includes an input switch 31 and a transmitter circuit 32 which broadcasts the unique engine ignition signal when the input switch 31 is depressed.

The second radio frequency transmitter 24 produces a second radio frequency signal hereinafter referred to as the garage door opener actuation signal to energize an actuator to move an object. In a preferred embodiment of the present invention, the object is the garage door 18 and, accordingly, the actuator includes means for opening the garage door 18. Thus, the garage door opener actuation signal energizes the garage door opener 20 to move the garage door 18. The second transmitter 24 includes an input switch 34 and a transmitter circuit 36 which broadcasts the unique garage door opener actuation signal when the input switch 34 is depressed or when the second transmitter 24 is energized by the receiver 26. Unlike the first transmitter 22, the second transmitter 24 preferably includes a memory circuit 38 for receiving, copying, and reproducing one or more different radio frequency signals. In this manner, the second transmitter 24 can "learn" one or more radio signals and eliminate the need to carry or store several separate transmitters in the vehicle to operate a garage door opener, security gate opener, home security system, and/or home lighting system. Accordingly, the second transmitter 24 is sometimes referred to in the art as a universal or trainable transmitter.

The receiver 26 includes an antenna 40 for capturing local airborne radio frequency signals. The receiver 26 actuates a vehicle accessory and energizes the second radio frequency transmitter 24 to produce the garage door opener actuation signal upon receipt of the engine ignition signal. Preferably, the receiver 26 actuates the engine starter motor 30 as the vehicle accessory. Upon receipt of the engine ignition signal, the receiver 26 actuates the engine starter motor 30 by supplying power from an electrical power supply 42 through the receiver 26 to the engine starter motor 30 as shown in FIG. 2 or by switching power from the power supply 42 to the engine starter motor 30 through a relay or other components.

In a preferred embodiment of the present invention, the remotely controlled electrical accessory system 12 includes a proximity sensor 28 for producing a gating signal in response to the position of the garage door 18 for controlling the second radio frequency transmitter 24 to produce the garage door opener actuation signal. That is, the proximity sensor will "sense" an obstruction and send a signal when the garage door is closed.

In one preferred embodiment of the present invention, the receiver 26 actuates the engine motor starter 30 in response to the engine ignition signal and energizes the second radio frequency transmitter 24 to produce the garage door opener actuation signal in response to both the engine ignition signal and the gating signal. In a second preferred embodiment of the present invention, the receiver 26 actuates the engine motor starter 30 and energizes the second radio frequency transmitter 24 to produce the garage door opener actuation signal in response to the engine ignition signal and reenergizes the second radio frequency transmitter 24 to reproduce the garage door opener actuation signal in response to the gating signal.

In a preferred embodiment of the present invention, the remotely controlled electrical accessory system 12 further includes a shut-off switch 44 for disabling the receiver 26 from energizing the second radio frequency transmitter 24. In this manner, actuation of the garage door opener 20 through the receiver 26 can be disabled if the vehicle 10 has been parked outside the garage 16.

In accordance with the present invention, the garage door opener 20 includes means for opening the garage door 18. Conventionally, the garage door opener 20 includes a motor 46 to open and close the garage door 18 upon receipt of the unique garage door opener actuation signal. One of ordinary skill in the art will recognize that the garage door opener 20 may include an antenna 48 to capture local airborne frequency signals including the unique garage door opener actuation signal broadcasted by the second radio frequency transmitter 24.

In accordance with the present invention, three methods for starting an engine of a vehicle and actuating a garage door opener are disclosed. As will be appreciated by one of ordinary skill in the art, the order of the steps is not important to achieving the objects of the present invention. As will also be recognized, the methods may be performed in software, hardware, or a combination of both as in a preferred embodiment of the invention.

FIG. 3 is a flow chart of a first method 50 for remotely starting an engine of a vehicle and actuating a garage door opener in accordance with the present invention. The steps of the first method 50 include: transmitting an engine ignition signal, as represented by block 52; starting the engine of the vehicle in response to the engine ignition signal, as represented by block 54; transmitting a garage door actuation signal in response to the engine ignition signal, as represented by block 56; and opening the garage door in response to the garage door actuation signal, as represented by block 58. Each of these steps can be performed by the remotely controlled electrical accessory system 12, as described above, upon activation of the system 12.

In this first method, which is not presently the preferred method, someway of providing a unique signal to open the garage door is necessary.

FIG. 4 is a flow chart of a second method 60 for remotely starting the engine of the vehicle and actuating the garage door opener in accordance with the present invention. The steps of the second method 60 include: transmitting an engine ignition signal, as represented by block 62; starting the engine of the vehicle in response to the engine ignition signal, as represented by block 64; determining that the garage door is closed, as represented by block 66; transmitting a garage door actuation signal in response to the determination that the garage door is closed, as represented by block 68; and opening the garage door in response to the garage door actuation signal, as represented by block 70. If the garage door is not closed during step 66, then steps 68 and 70 are skipped. Each of these steps can be performed by the preferred embodiment of the remotely controlled electrical accessory system 12 including the proximity sensor 28, as described above, upon activation of the system 12.

FIG. 5 is a flow chart of a third method 80 for remotely starting the engine of the vehicle and actuating the garage door opener with accordance with the present invention. The steps of the third method 80 include: transmitting an engine ignition signal, as represented by block 82; starting the engine of the vehicle in response to the engine ignition signal, as represented by block 84; determining that the garage door actuation function is on, as represented by block 86; transmitting a garage door actuation signal in response to the determination that the garage door actuation function is on, as represented by block 88; delaying for a predetermined amount of time (X seconds) to allow the garage door to move, as represented by block 90; and determining that the garage door is open, as represented by block 92. If the garage door actuation function is not on during step 86, then steps 88, 90, and 92 are skipped. If the garage door is not open during step 92, then the third method 80 proceeds back to step 88. Each of these steps can be performed by the preferred embodiment of the remotely controlled electrical accessory system 12 including the proximity sensor 28 and the shut-off switch 44, as described above, upon activation by an operator. Most importantly, the third method 80 is particularly effective in handling a half-closed garage door condition. Conventional garage door openers operate with only one actuation signal. If the garage door is open, the garage door opener will close the garage door upon receipt of the next actuation signal. If the garage door is closed, the garage door opener will open the garage door upon receipt of the next actuation signal. Further, conventional garage door openers can be manipulated to stop the garage door at a half-closed position. If the garage door is half-closed, the transmission of the garage door opener actuation signal, as represented by step 88, will completely close the garage door. Thus, the garage door will be closed during step 92. Accordingly, the third method 80 will proceed back to step 88 and retransmit the garage door opener actuation signal to open the garage door. In this manner, the third method 80 is particularly effective in opening a half-closed garage door.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A remotely controlled vehicle accessory system comprising:
   a radio frequency transmitter for producing a first radio frequency signal;
   a radio frequency transmitter for producing a second radio frequency signal to energize an actuator to move an object;
   a sensor for producing a gating signal in response to the position of the object; and
   a receiver for actuating a vehicle accessory in response to said first radio frequency signal and for energizing said second radio frequency transmitter to produce said second radio frequency signal in response to said first radio frequency signal and said gating signal.

2. A vehicle accessory system as set forth in claim 1 wherein the receiver is arranged to control the second radio frequency transmitter to reproduce said second radio frequency signal in response to said gating signal.

3. A vehicle accessory system as set forth in claim 1 including a shut-off switch for disabling said receiver from energizing said second radio frequency transmitter.

4. A vehicle accessory system as set forth in claim 1 wherein said first and second signals are produced by first and second transmitters, and said first radio frequency transmitter comprises a portable housing and circuitry.

5. A vehicle accessory system as set forth in claim 1 wherein said second radio frequency transmitter includes a memory circuit for receiving and reproducing said second radio frequency signal.

6. A vehicle accessory system as set forth in claim 1 wherein the actuator includes means for opening a garage door.

7. A vehicle accessory system as set forth in claim 1 wherein said receiver actuates an engine starter motor as the vehicle accessory.

8. A vehicle accessory system as set forth in claim 1 wherein the object comprises a garage door, and said sensor produces said gating signal in response to the position of the garage door.

9. A remotely controlled electrical accessory system for starting an engine of a vehicle and actuating a garage door opener attached to a garage door, the system comprising:
   a first transmitter for producing an engine ignition signal,
   a second transmitter for producing a garage door opener actuation signal,
   a proximity sensor attached to the vehicle for producing a gating signal in response to the garage door being in an obstructing position, and
   a receiver for starting the engine of the vehicle in response to said engine ignition signal and for energizing said second transmitter to produce said garage door opener actuation signal in response to said engine ignition signal and said gating signal.

10. An accessory system as set forth in claim 9 wherein said receiver starts the engine of the vehicle and energizes said second transmitter to produce said garage door opener actuation signal in response to said engine ignition signal and reenergizes said second transmitter to reproduce said garage door opener actuation signal in response to said gating signal.

11. A method for remotely starting an engine of a vehicle and opening a garage door, the method comprising the steps of:
   transmitting an engine ignition signal;
   starting the engine of the vehicle in response to the engine ignition signal;
   determining that the garage door is in a closed position;
   transmitting a garage door actuation signal in response to the engine ignition signal; and
   opening the garage door in response to the garage door actuation signal.

12. A method as set forth in claim 11 wherein the step of opening the garage door consists of actuating a garage door opener attached to the garage door.

13. A method as set forth in claim 11 wherein the step of determining that the garage door is closed consists of sensing that the garage door is in an obstructing position.

14. A method as set forth in claim 11 including the step of determining that a garage door actuation function has been selectively enabled prior to transmitting the garage door actuation signal.

15. A method as set forth in claim 14 including the step of determining that the garage door is closed after the step of transmitting the garage door actuation signal.

16. A method as set forth in claim 15 including the step of retransmitting the garage door actuation signal after the step of determining that the garage door is closed.

* * * * *